3,105,800
METHOD OF MANUFACTURING A NEGATIVE TEMPERATURE COEFFICIENT RESISTANCE ELEMENT
Toshio Watanabe, 480 2-chome Kamitakaido, Suginami-ku, Tokyo, Japan
No Drawing. Filed Feb. 15, 1960, Ser. No. 8,524
1 Claim. (Cl. 204—61)

This invention relates to a negative temperature coefficient resistance element and the method for manufacturing base material for such an element, particularly for such semi-conductors with titanium sesquioxide as base which are applied, for example, to thermistors.

Theoretically, the thermistor constant is expressed by the formula $$B = \frac{E}{K}$$

where E is the activation energy and $k$ the Boltzmann's constant, whose value $k = 1.38031 \times 10^{-16}$ ergs deg.$^{-1}$. And it is known that the following equation indicates the relation between B, resistance value of semi-conductor and temperature ° K (Kelvin's temperature), namely $$R = R_0 \exp B(1/T - 1/T_0)$$

where

R represents resistance value at temperature T° K.,
$R_0$ represents resistance value at temperature $T_0$° K.

And that the thermal coefficient α (percent) of a semi-conductor at temperature T° K. is expressed by $\alpha = B/T^2$.

The electric conductivity of the semi-conductor governed by such theoretical equation or formula indicates that it changes according to temperature, and the thermal coefficient α, the rate of change, is proportional to the value of the activation energy E. Many substances have heretofore been used to provide a negative temperature coefficient resistance element. Metals and intermetallic compounds have very high electric conductivity, regardless application made either as simple substance or as intermetallic compound and conductivity ascribable either to electrons or positive holes, and as they have on the contrary low activation energy, have had to show low thermal coefficient. As oxide semi-conductors, we have two types, namely oxidation (P-type) and defect (N-type) semi-conductors, and the ones generally obtainable are those that have high activation energy, i.e. high thermal coefficient but low electric conductivity, and it has been difficult to obtain semi-conductors that have high electric conductivity and high activation energy. There has now been discovered a method to produce those oxide semi-conductors that have high activation energy (E), consequently high thermistor constant ($B = E/k$) and therefore high thermal coefficient

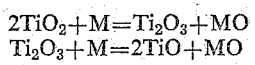

and moreover high electric conductivity, i.e. low specific resistance (Ω cm.).

One of the objects of the present invention is to provide a base material for a negative temperature coefficient resistance element that has low specific resistance but high B, by sintering $Ti_2O_3$ of high purity in an inert gas, the $Ti_2O_3$ of high purity being obtained by electrochemical or metallurgical treatment of $TiO_2$ of high purity as raw material.

Another object of the present invention is to provide $Ti_2O_3$ of high purity by electro-chemical or metallurgical treatment where $TiO_2$ is fused together with Ca, Mg, etc. namely such metal as would work to reduce said $TiO_2$.

Other objects and advantages of the present invention will become apparent from the following description:

As titanium oxides, we have titanium monooxide (TiO), titanium dioxide ($TiO_2$) and titanium sesquioxide ($Ti_2O_3$), and as items to be considered their compounds or synthetic formations, we have titanium magnetite ($Ti_3O_4$) and anosorites ($Ti_3O_5$). Among them the titanium dioxide ($TiO_2$) is applied as raw material in the present invention. I begin with the electro-chemical method. $TiO_2$ and anhydrous calcium chloride, the latter gravimetrically 3–6 times as much as the $TiO_2$, were thoroughly mixed, then heated and melted in a graphite crucible, and at 950° C. were impressed with D.C. with the graphite crucible as cathode and a graphite rod as anode, the decomposition voltage standing at 5–7 volt and the current density at 80–120 a./dm.². In the electrolysis a chemical reaction goes on which is shown by the formulae:

$$2TiO_2 + M = Ti_2O_3 + MO$$
$$Ti_2O_3 + M = 2TiO + MO$$

In my test Ca was applied as M. For M$^{+1}$, also Mg, Al, etc., could be suggested, but these had better be left aside, as it is difficult to remove the aluminum oxide ($Al_2O_3$) formed by hydrochloric acid, as will be stated later. The electrolysis separated calcium chloride into calcium and chlorine, and the calcium then worked to form titanium sesquioxide ($Ti_2O_3$) and titanium oxide (TiO) plus the impurities, by reducing $TiO_2$, according to the chemical formulae given above. With Mg as substitute for Ca, the same result could be attained by applying anhydrous magnesium chloride ($MgCl_2$). Next I use the metallurgical method which consists in the reduction of $TiO_2$ of high purity as raw material. $TiO_2$ and NaCl, the latter gravimetrically 3–6 times as much as the $TiO_2$, were mixed, then melted in a graphite crucible, and approximately at 950° C. there was added Mg or Ca of some 150% of the theoretical quantity for reduction of $TiO_2$, then zinc, either by itself or as alloy with said Mg or Ca, of 5–10% of the metal to be applied for reduction. The crucible was filled with argon as an inert gas. Contents in the crucible were mixed thoroughly. Such metallurgical method brought about, as with said electro-chemical one, mixture of $Ti_2O_3$ and TiO, with $TiO_2$ being reduced. Either of said methods brought a mixture of $Ti_2O_3$ and TiO and the impurities from crucible in briquette form which was ground into fine particles, then dissolved in approximately 20% hydrochloric acid. The residues resulting from the treatment with hydrochloric acid were then further treated by other well known processes such as filtration, washing, and so on until they were entirely removed and there finally remained crystals of titanium sesquioxide of high purity. The $Ti_2O_3$, obtained by the foregoing methods, always had the constant atomic ratio of Ti:2.000, O:2.920–2.940. After being pulverized in size under approximately 10 microns, the $Ti_2O_3$ was moulded and sintered in argon at 1200° C. for four hours.

The substance obtained in this way had the specific resistance of 0.03Ω cm., $B = 2100 \pm 100°$ K., the thermal electromotive force 135 μv. C.$^{-1}$ at 25° C. In order to obtain practical semiconductor material having a specific resistance and a high value of B, said crystals of $Ti_2O_3$ of high purity were pulverized under 10 microns. There was then added fine pulverized $TiO_2$, ZnO, $Mn_2O_3$ and $Cr_2O_3$, mixed and moulded and sintered approximately at 1200° C. for four hours, in the same way as in the case in which $Ti_2O_3$ alone was sintered. In order to carry out the generally known process of controlled valency, oxidation may take place in air at 400° C. to 650° C., so as to provide material having a negative temperature coefficient resistance element with a certain definite B and specific resistance.

The inventor made a series of tests for combining $Ti_2O_3$ with a number of metallic oxides so that the following gravimetric composition might be attained:

(a) $Ti_2O_3$:1.000, $TiO_2$:1.000, ZnO:0.02
(b) $Ti_2O_3$:0.750, $TiO_2$:1.000, ZnO:0.02, $Mn_2O_3$:0.250
(c) $Ti_2O_3$:0.500, $TiO_2$:1.000, ZnO:0.02, $Mn_2O_3$:0.500
(d) $Ti_2O_3$:0.750, $TiO_2$:1.000, ZnO:0.02, $Cr_2O_3$:0.250
(e) $Ti_2O_3$:0.500, $TiO_2$:1.000, ZnO:0.02, $Cr_2O_3$:0.500
(f) $Ti_2O_3$:0.250, $TiO_2$:1.000, ZnO:0.02, $Mn_2O_3$:0.250, $Cr_2O_3$:0.250

The above described mixtures having the compositions lettered: a to f, were pulverized under 10 microns and molded in a metal mold with an outer diameter of 8 mm. and a height of 5 mm., heated in a nitrogen atmosphere at 1200° C. for four hours, and at 200° C. for four hours after the first heating treatment, taken out of the heating furnace and connected to an electrode. Measurement of values of performance brought the following results:

| Composition of semi-conductor | Subjected to controlled valency process at 500° C. | | Subjected to controlled valency process at 600° C. | |
|---|---|---|---|---|
| | Specific resistance ($\Omega$ cm.) at 25° C. | B(° K.) | Specific resistance ($\Omega$ cm.) at 25° C. | B(° K.) |
| a | 8.0 | 2,700 | 20.5 | 3,700 |
| b | 35.0 | 3,700 | 50.0 | 4,000 |
| c | 80.0 | 4,600 | 160.0 | 4,700 |
| d | 50.0 | 4,000 | 80.0 | 3,700 |
| e | 120.0 | 4,400 | 220.0 | 4,000 |
| f | 100.0 | 4,500 | 200.0 | 4,300 |

As can readily be seen from the foregoing table, it is possible to manufacture material having a negative temperature coefficient resistance having a higher thermal coefficient and a lower specific resistance than heretofore.

What is claimed:

A method of manufacturing the base material for a negative temperature coefficient resistance element, comprising the steps of, mixing with titanium dioxide, between about 3 to 6 times as much material selected from the group consisting of calcium chloride and magnesium chloride; heating and melting said mixture in a graphite crucible at a temperature of about 950° C.; passing a D.-C. voltage therethrough using the graphite crucible as cathode and a graphite rod as anode thereafter forming a briquette mixture of the resultant titanium sesquioxide, titanium oxide and impurities; grinding said briquette mixture into fine particles; dissolving said particles in a 20% hydrochloric acid solution; and, filtering and washing said resultant to obtain a titanium sesquioxide of fine purity having negative temperature coefficient resistance characteristics.

References Cited in the file of this patent
UNITED STATES PATENTS

| | | |
|---|---|---|
| 921,686 | Fitz Gerald et al. | May 18, 1909 |
| 2,289,211 | Ridgeway | July 7, 1942 |
| 2,681,850 | Sibert | June 22, 1954 |
| 2,681,851 | Sibert et al. | June 22, 1954 |
| 2,707,168 | Wainer et al. | Apr. 26, 1955 |
| 2,792,310 | Steinberg | May 14, 1957 |
| 2,848,303 | Cooper | Aug. 19, 1958 |
| 2,933,458 | King et al. | Apr. 19, 1960 |

OTHER REFERENCES

Gmelin: "Handbuch der Anorganischen Chemie," 1951, System No. 41, pages 221–224.

Wurtz: "Dictionnaire de Chemie," Tome 3 S–Z (1878), page 419.

Sidgwick: "The Chemical Elements and Their Compounds," vol. 1, page 651, Oxford Univ. Press., London.

Comey and Hahn book, "A Dictionary of Chemical Solubilities—Inorganic," 1921, page 1083, The Macmillan Co., N.Y.